March 12, 1929.  C. T. DRAPER  1,705,084
METHOD OF DRYING CYLINDRICAL ARTICLES
Filed July 28, 1924   9 Sheets-Sheet 1
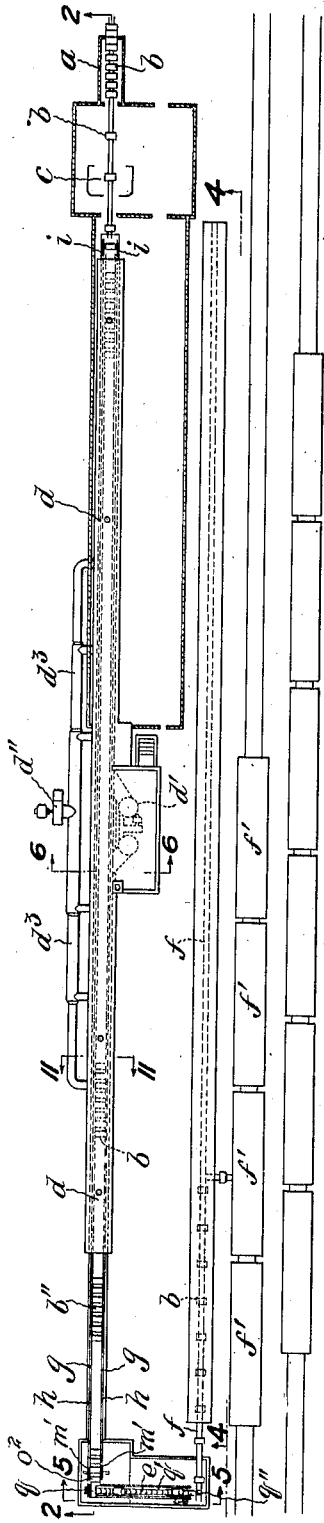
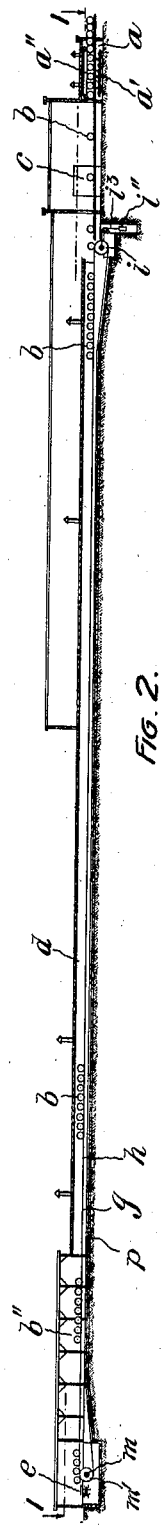
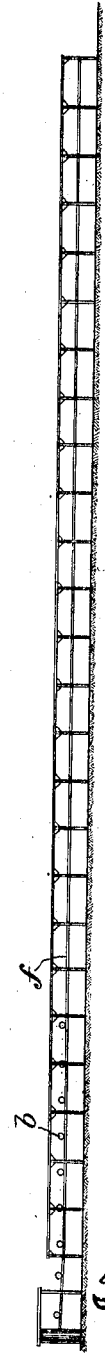
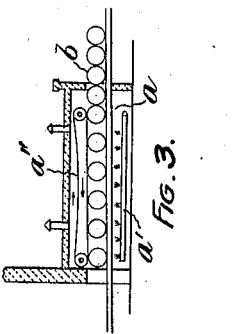
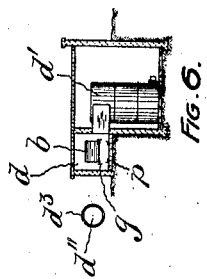
INVENTOR
CHARLES T. DRAPER
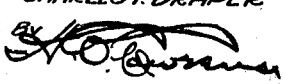
ATTORNEY.

March 12, 1929.  C. T. DRAPER  1,705,084
METHOD OF DRYING CYLINDRICAL ARTICLES
Filed July 28, 1924   9 Sheets-Sheet 2

INVENTOR
CHARLES T. DRAPER
BY
ATTORNEY

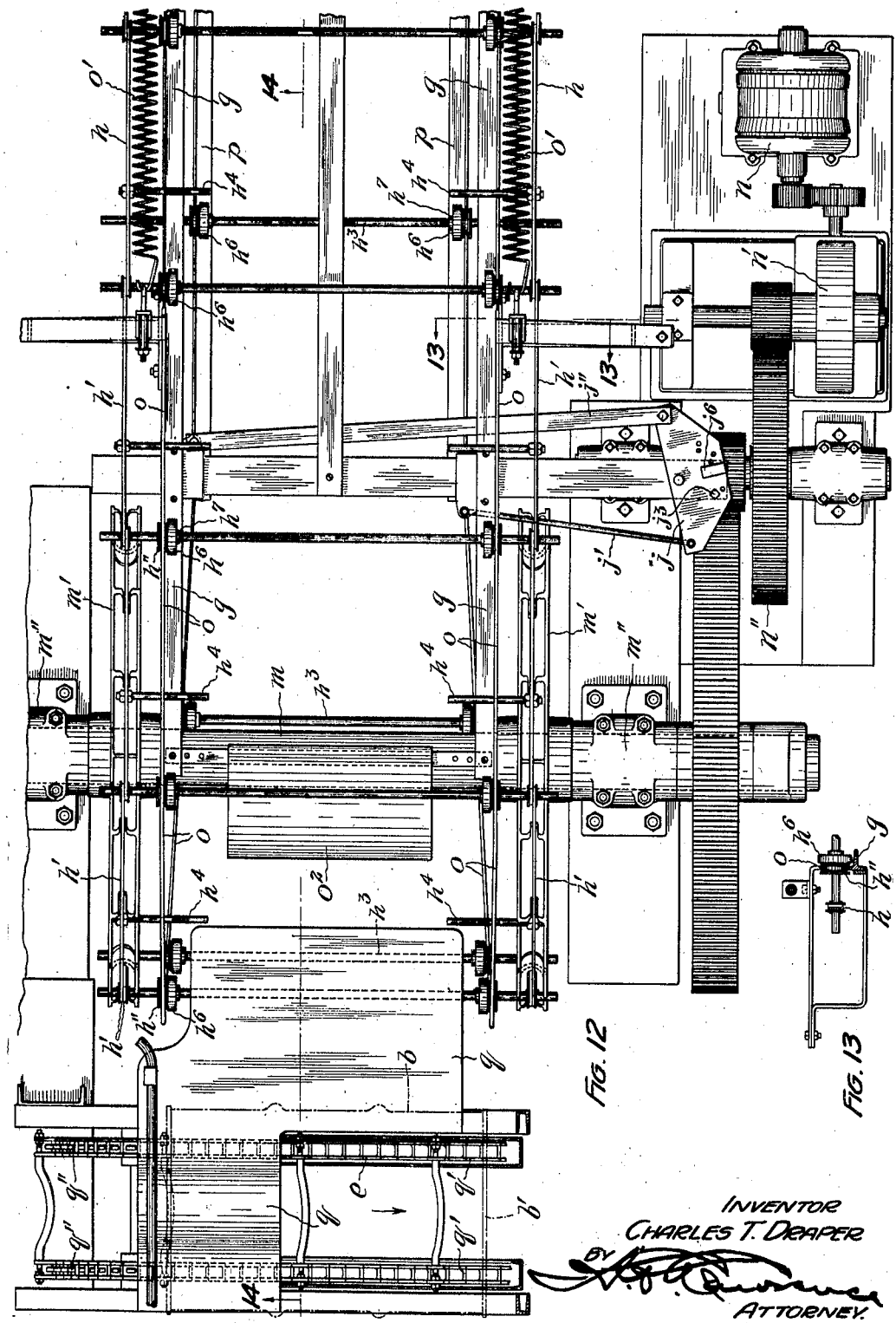

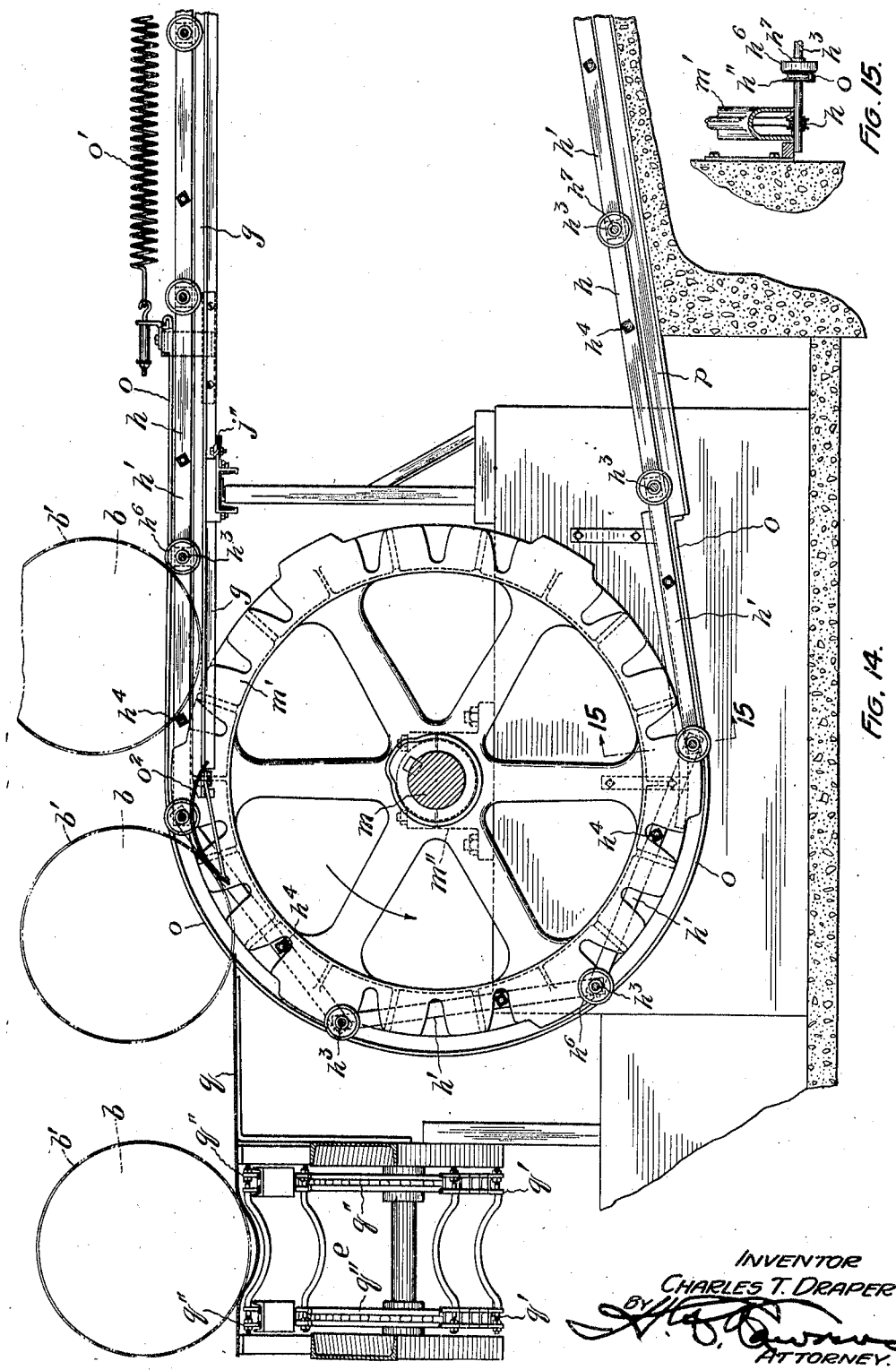

March 12, 1929. C. T. DRAPER 1,705,084
METHOD OF DRYING CYLINDRICAL ARTICLES
Filed July 28, 1924 9 Sheets-Sheet 8

INVENTOR
CHARLES T. DRAPER
BY
ATTORNEY.

March 12, 1929.    C. T. DRAPER    1,705,084
METHOD OF DRYING CYLINDRICAL ARTICLES
Filed July 28, 1924    9 Sheets-Sheet 9

INVENTOR:
CHARLES T. DRAPER
BY
ATTORNEY

Patented Mar. 12, 1929.

1,705,084

UNITED STATES PATENT OFFICE.

CHARLES T. DRAPER, OF CLEVELAND, OHIO, ASSIGNOR TO THE DRAPER MANUFACTURING COMPANY, OF CLEVELAND, OHIO, A CORPORATION OF OHIO.

METHOD OF DRYING CYLINDRICAL ARTICLES.

Application filed July 28, 1924. Serial No. 728,535.

My invention relates to improvements in method of drying cylindrical articles, and more especially sheet metal containers that are coated or painted exteriorly or interiorly. The object of my invention is to dry quickly and evenly such coated articles at minimum expense without impairing the appearance of the article, while aiding in maintaining the evenness of the coating during the drying process.

I shall describe my improvement as applied to the surface painting of sheet metal barrels, although my invention is much more comprehensive in its scope, as indicated by the appended claims. Briefly describing then, its instant application in a preliminary way, I may say that the sheet metal barrels are initially heated and submitted to the painting operation as to both ends and sides, either manually or mechanically applied, after which they are placed upon an extended runway whereon they are supported solely by their chime rings. This runway is provided with means for slowly advancing the barrels from one end to the other, rolling them along their end supports in a heated atmosphere which preferably is in circulation and is adapted quickly to dry the paint. Means are provided upon said runway which are adapted to maintain the spacing of the barrels and prevent their contact with each other and with any portion of the mechanism that otherwise might mar the appearance of the completed container. The initial portion of the runway comprises a dry-heater or oven while the terminal portion preferably is open to the circulation of air, whereby the painted or enamelled surfaces of the barrels are sufficiently cooled to permit of handling without affecting their appearance. Preferably, elevating and loading mechanisms are associated with the apparatus of my invention in order to facilitate and cheapen the handling and are here adverted to, although these form no part of my present invention and will not be described in detail.

The features, advantages and preferred mode of operation of my improved mechanism may now be explained in connection with the accompanying sheets of drawings, wherein:

Figure 1, is a diagrammatic plan view of the system of my invention and its associated loading mechanism.

Fig. 2, is a longitudinal sectional view thereof, on line 2—2, Fig. 1.

Fig. 3, is a slightly enlarged view of the heating appliance; all of the figures on Sheet 1, however, being upon an extremely reduced scale.

Fig. 4, is a side elevation of the skidway on line 4—4, Fig. 1, on which the loading takes place.

Fig. 5, is a sectional view of the elevating mechanism associated with the skidway, on line 5—5, Fig. 1.

Fig. 5ª, is a fragmentary view thereof upon an enlarged scale.

Fig. 6, is a transverse sectional view of the furnace on line 6—6, Fig. 1, while the remaining figures of the drawings are upon materially larger scales to represent the details of the apparatus diagrammatically shown on Sheet 1.

Figure 7:
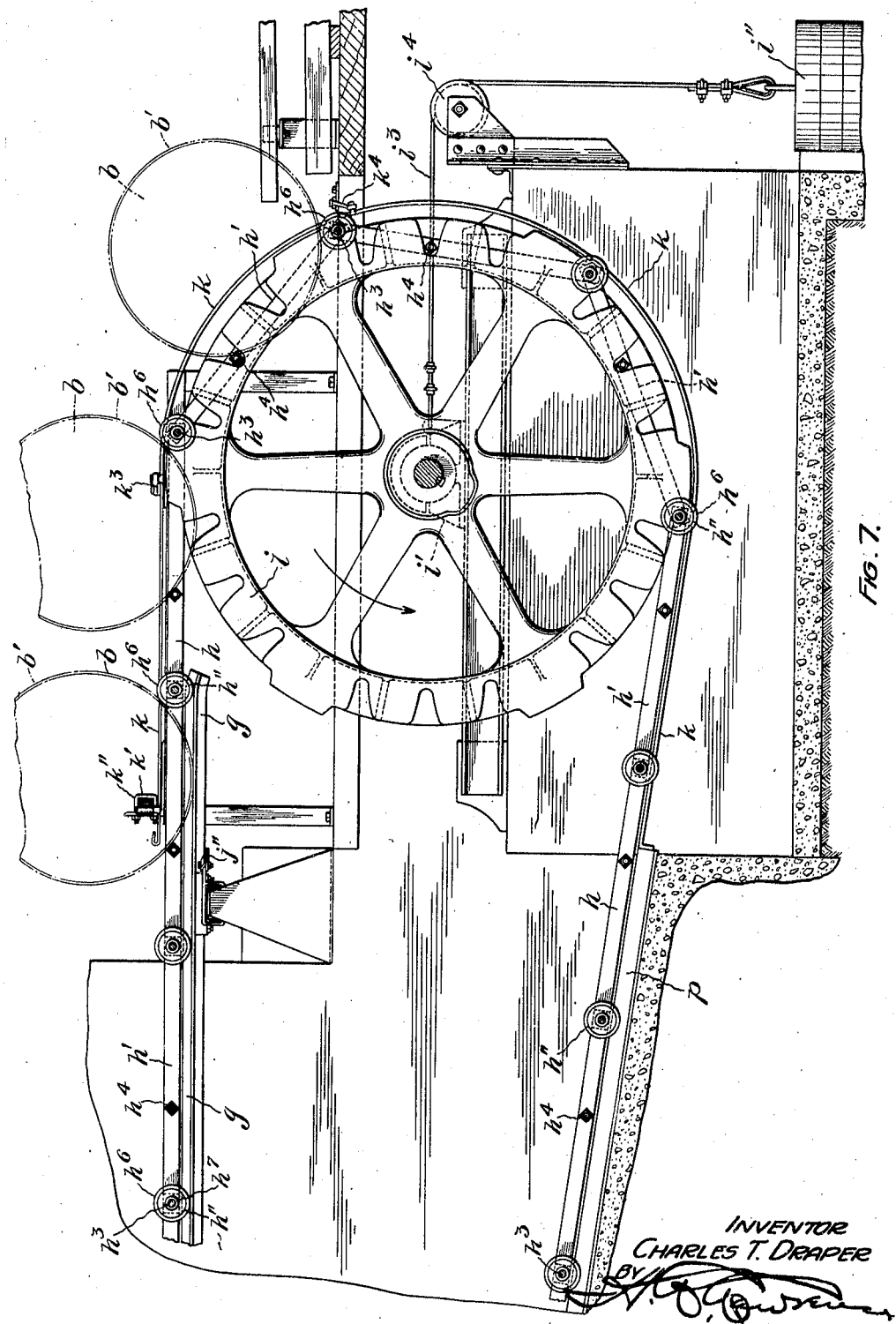
Figure 8:
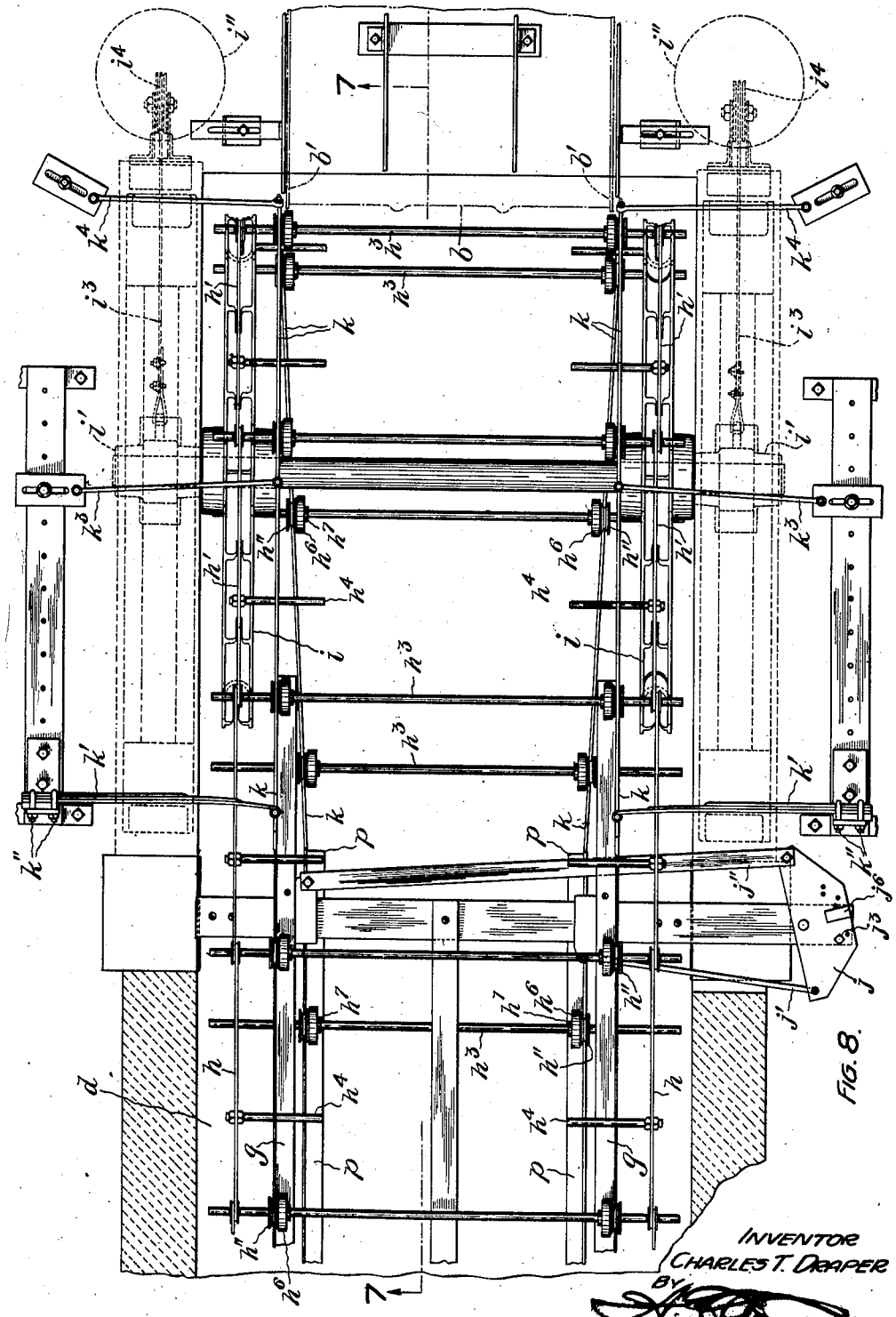

Fig. 7 is an enlarged vertical section on line 7—7, Fig. 8, showing the loading end of the conveyor mechanism.

Fig. 8, is a plan view of said loading end of the conveyor.

Figure 9:
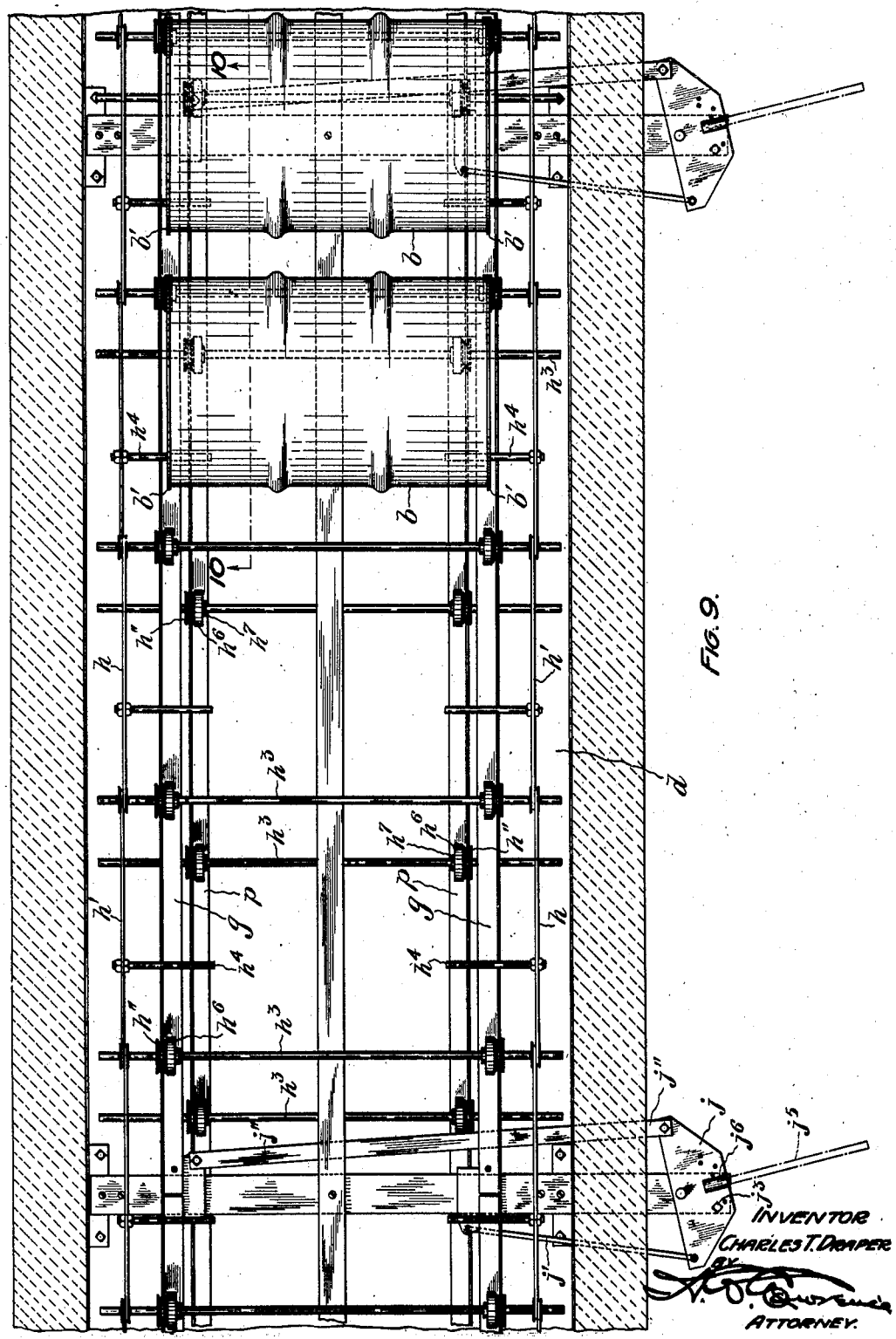
Figure 10:
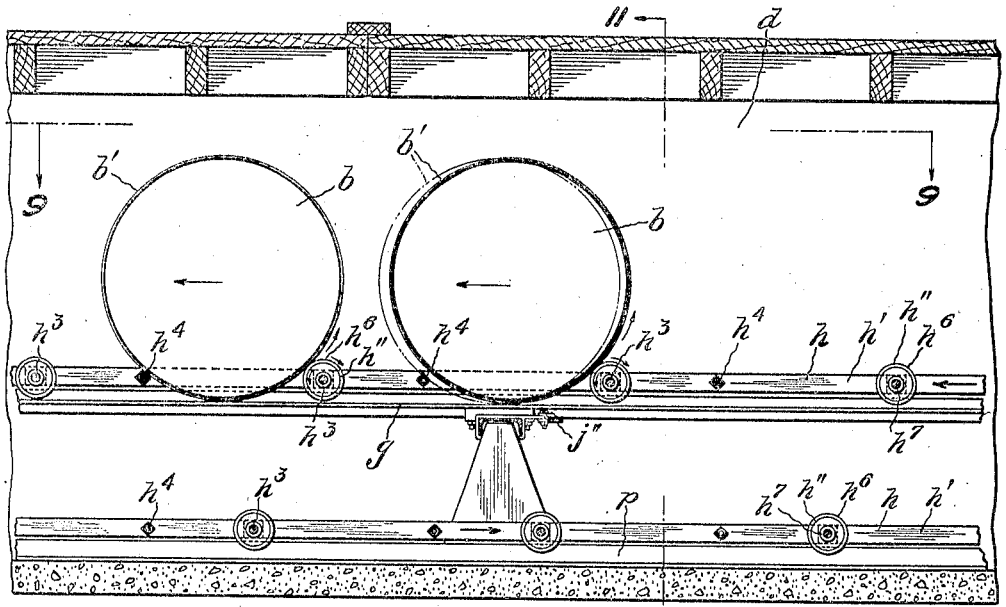

Fig. 9, is a plan view of an intermediate portion of the heating chamber and conveyor on line 9—9, Fig. 10.

Figure 11:
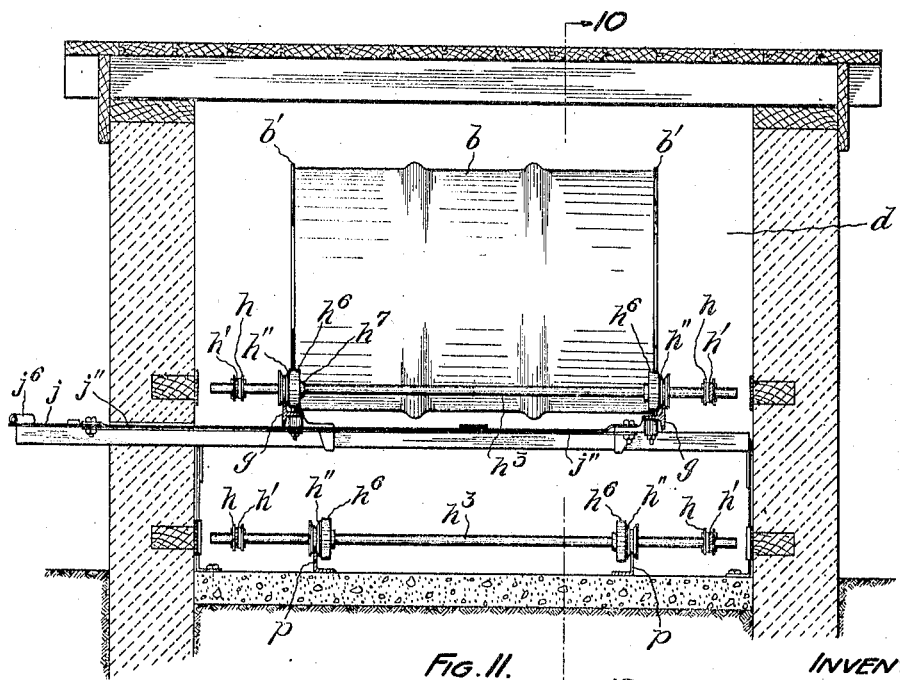

Fig. 10, is a vertical section thereof, on line 10—10, Figs. 9 and 11.

Fig. 11, is a transverse section on line 11—11, Figs. 1 and 10.

Fig. 12, is a plan view of the discharging and elevating mechanism; the latter being broken away.

Fig. 13, is a fragmentary section on line 13—13, Fig. 12 illustrating a detail of the guide rod anchorage.

Fig. 14, is a vertical section through the discharge end of the conveyor on line 14—14, Fig. 12.

Fig. 15, is a fragmentary section on line 15—15, Fig. 14.

Figure 16:
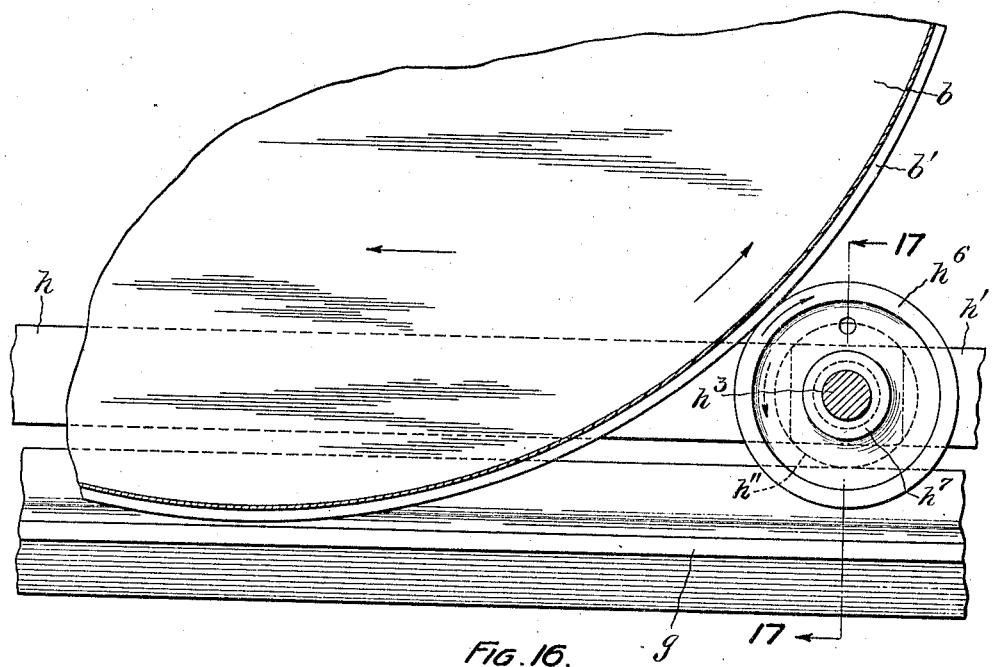

Fig. 16, is a fragmentary view upon an enlarged scale illustrating the action of the composite roller in association with the barrel.

Figure 17:
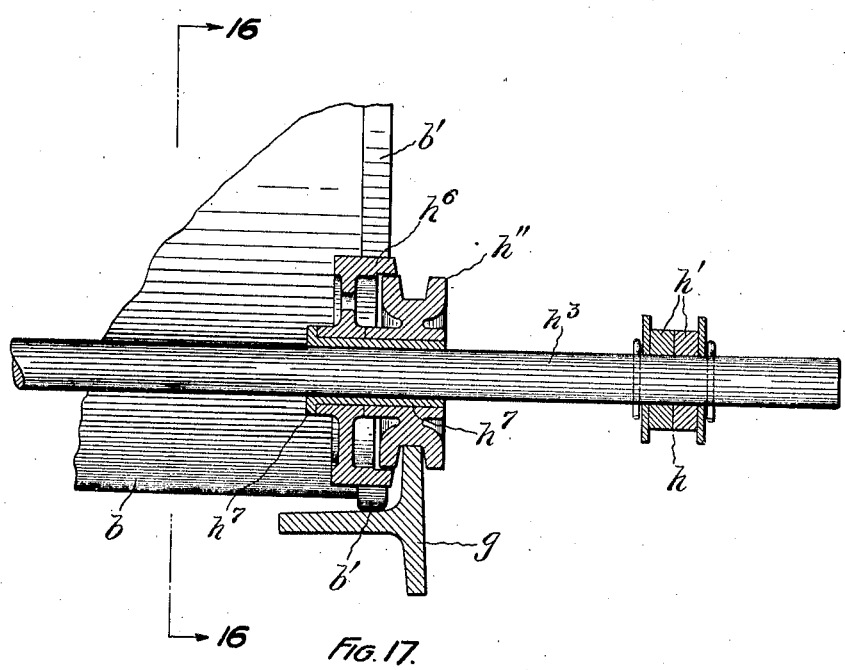

Fig. 17, is a fragmentary section thereof on line 17—17, Fig. 16.

Figure 18:
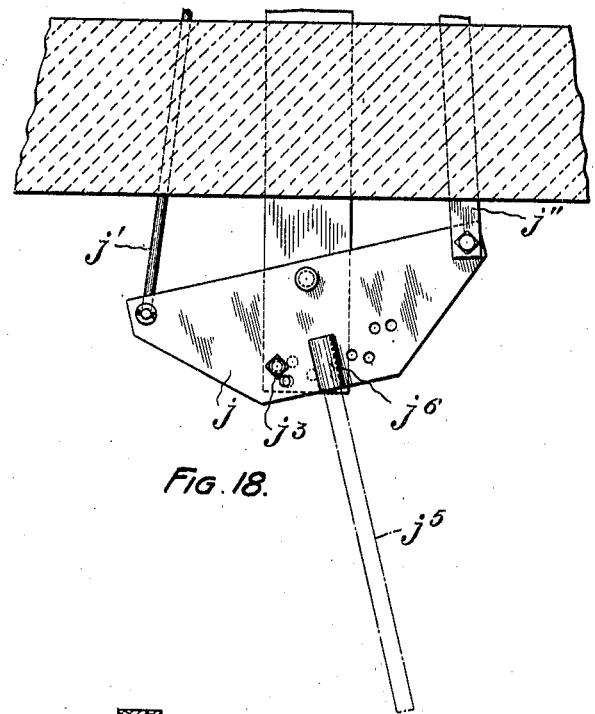
Figure 19:
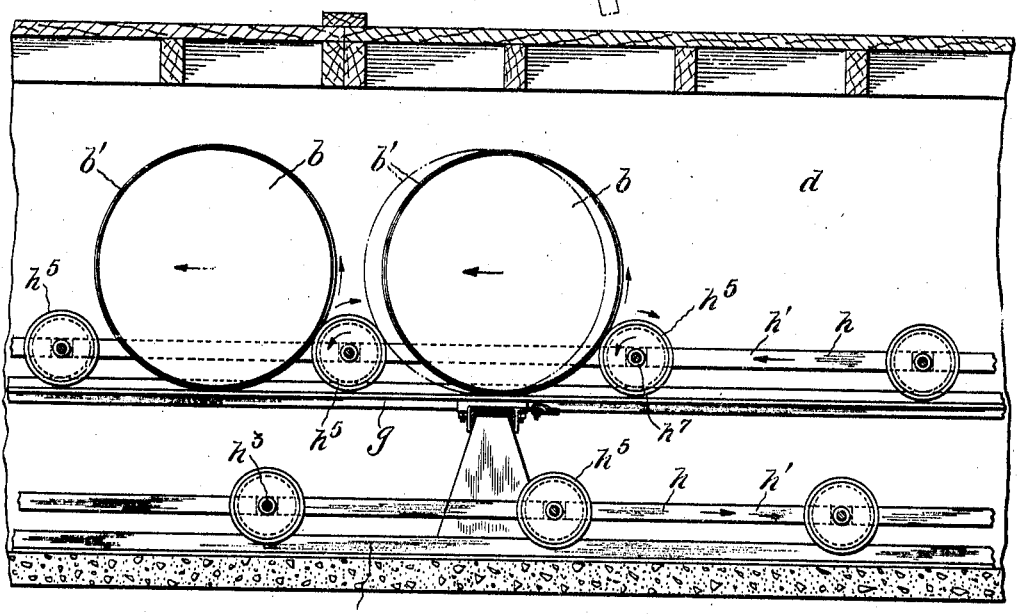

Fig. 18, is a fragmentary plan view of the adjusting retaining mechanism for altering the gauge of the supporting rails, and, Fig. 19, is a vertical sectional view similar to Fig. 10, showing a modification of the rolls to accomplish both the spacing and advancing of the barrels.

Throughout the several figures of the drawings I have employed the same character of reference to indicate similar parts.

Referring first to Sheet 1, it should be understood that the sheet metal barrels are supplied to the system or apparatus shown at the right, advanced longitudinally toward the left, after being suitably painted or coated and transferred from the left hand or loading end of the apparatus to freight cars or other carriers. The diagrammatic plan view of Fig. 1, is intended to show a heater $a$ upon the extreme right to which the barrels $b$ or other sheet metal containers are introduced, after which they are suitably painted, coated or enameled at $c$, either exteriorly, including their ends, or interiorly, or an acid-resisting lining, such as paraffin may be applied to such containers. All this is accomplished in accordance with well-known practice and does not require explanation in detail.

The barrels $b$ upon being suitably treated are supported terminally by their chime rings upon parallel rails extending through a heated passageway $d$, associated with a furnace $d'$ and exhausting mechanism $d''$ for effecting a circulation of heated air throughout the said passageway in order to effect rapid drying of the barrels. Since the barrels are initially heated, it will be observed that those barrels which are exteriorly painted or enameled will be dried both interiorly and exteriorly of the protective coating, thus materially hastening the operation in the passage $d$.

The barrels preferably are supplied to a suitable conveyor, later explained in detail, which rolls them slowly through the passageway in a heated atmosphere which will effectually dry them, after which they are exposed to atmospheric air, as at $b''$, in order to cool the heated surfaces, or chill the paraffin, if this material is used, prior to advancing the barrels by rolling them upon the elevating mechanism $e$ which delivers said barrels to a skidway $f$ from which they may be loaded into the waiting freight cars $f'$.

The heater $a$ is diagrammatically indicated in Fig. 3, equipped with gas burners $a'$ and a travelling belt $a''$ for passing the barrels $b$ from one end thereof to the other. The elevating mechanism $e$ shown in fragmentary and reduced scale sections in Figs. 4 and 5, and the drying furnace $d'$ with the conduit $d^3$ of the exhausting system appear in Fig. 6 as diagrammatically related for co-operation, but require no specific explanation as these features are merely adjuncts of the invention or improvements herein explained.

The conveyor mechanism comprises essentially two parallel supporting rails $g$ $g$ extending substantially the length of the system with which are associated conveyor chains $h$ formed of link-bars $h'$ terminally supported by grooved rollers $h''$ upon said rails. Sprocket wheels $i$ accommodate the endless chains and turn them from the lower to the upper or conveying level, as will be best understood by referring to Fig. 7.

The grooved supporting rollers $h''$ readily slide laterally upon their shafts $h^3$ which extend transversely from chain to chain and intermediately of said rollers spacing members $h^4$ preferably are secured upon the link-bars in opposed paired arrangement.

It will be understood that a system of the character herein shown must be adapted for use with various sizes of containers and since these are to be terminally supported, preferably by their chime rings upon the supporting rails, it is necessary to make the rails relatively adjustable toward and from each other for the purpose of accommodating barrels and containers of various sizes. The means for adjusting the rails are applied at intervals throughout the length of the conveying mechanism, of which they form a part, and comprise a pivoted blade $j$ having links $j'$ $j''$ respectively connected terminally with the two supporting rails so that upon moving said blade about its pivot, the rails will be separated or approximated with respect to each other until suitably adjusted for the particular size of container which is to be handled. A bolt, as $j^3$, may be inserted in any of the registering openings, as best shown in Fig. 18, for the purpose of locking the rails in their adjusted position. Desirably, a lever $j^5$ may be inserted within the socket $j^6$ provided upon the blade $j$ more easily to actuate the supporting rails into their different positions of adjustment when the bolt is removed. The grooved rollers $h''$ automatically conform to the gauge of the supporting rails as they readily slide along their shafts in conformance with the adjustment of said rails, and in order to bring them into alinement when travelling from their lower to their upper positions, flexible rods $k$, Figs. 7 and 8, are adapted exteriorly to engage the grooved rollers during their transit from the lower to the upper positions of the conveyor chains. The upper ends of said rods are tensioned by the leaf-springs $k'$, said springs being adjustably held at their outer ends by shackle-bolts $k''$, while adjustably supported links $k^3$ and $k^4$ intermediately position these flexible rods $k$.

Because of the fact that the conveyor chains are subjected to considerable variations in temperature, it will be understood that their expansion and contraction must be compensated and this feature is provided for by slidably mounting the bearings $i'$ of the sprocket wheels so that the chains will be tensioned by means of the heavy weights $i''$ supported by cables $i^3$ extending over the pulley wheels $i^4$ to said bearing blocks as best shown in Fig. 7.

The outer or delivery end of the system embodies features generally similar to those just explained above; the details of adjusting the gauge of the rail-supports, the sprocket wheels and upper and lower positions of the chains being the same, although the shaft $m$ for said sprocket wheel $m'$ is rigidly journaled at $m''$, Figs. 12 and 14, to afford suitable driving connections. This is provided in the electric motor $n$ and associated worm-drive $n'$ and gearing $n''$ of obvious mechanical construction. The motor $n$ is of low power for the reason that the barrels merely are rolled by the chain drive along the runway while the impelling chains are supported by rollers in their upper and lower levels so that little power is required. The flexible rods $o$ which terminally are in alinement respectively with the upper and lower levels of the rail-supports for the chains, are tensioned by means of coiled springs $o'$ and since the lower rails $p$ are of fixed gauge, these rods serve to bring the rollers leaving the upper rail-supports $g, g$, into alinement with the lower rails $p, p$, as the chains leave the bottoms of the sprocket wheels turning in a counter clockwise direction, as indicated in Figs. 12, 13 and 15.

A curved member $o^2$ is provided intermediately of the rail-supports $g, g$, from which the barrels $b$ are transferred to the platform $q$ of the elevating mechanism. This comprises connected chains $q'$ travelling over driven sprocket wheels $q''$ up an incline to the loading skidway, all of which form no part of my present invention and require no detailed description.

The rail-supports $g, g$, desirably may be formed of T-sections as shown in Figs. 11 and 17, while the lower rail-supports may be formed of angle irons; the vertical webs of both sections engaging the grooved rollers $h''$ which support the laterally positioned chains upon the shafts $h^3$ while the spacing members $h^4$ serve to maintain the barrels $b$ out of contact with each other as indicated in Figs. 9 and 10. However, said spacing members may be substituted by employing larger wheels, as $h^5$, Fig. 19, whose diameter is sufficient to prevent the surface contact of the barrels as is well indicated by the dotted line position of the right hand barrel.

Preferably, these supporting wheels for the chains are composite members comprising two separately journaled rollers as best shown in Fig. 17. One of these $h''$, as already pointed out, is grooved to accommodate the edge of the rail-support $g$, while the other roller, $h^6$, encloses the inner flange thereof and is adapted to bear against the chime ring $b'$ of the barrel; being frictionally rotated in a reverse direction to the turning of the roller $h''$ in order to impel the barrel along the runway with a minimum expenditure of force. The simple and effective action of these composite rollers will be understood at a glance by referring to Fig. 16. A sleeve $h^7$ mounts the composite rollers $h'', h^6$, for independent rotation with respect to each other.

It will be appreciated that the painted, enameled or paraffin coated barrels, as the case may be, preferably are continuously advanced along the runway and through the heated atmosphere of its enclosed portion by rolling them axially to retain or insure a smooth, even distribution of the protective coatings for the barrels. Suitable protective coatings are readily dried in the heated atmosphere, or paraffin, for example, may be evenly distributed throughout the interiors of the containers, and upon reaching the open section at the left of the runway, Fig. 1, the coatings will be cooled by the atmospheric air so that the completed barrel may be handled upon the elevating and loading mechanism as previously explained. A paraffin or similar waxlike coating, it will be understood, is solidified rather than dried, but I have employed the latter as a generic term descriptive of treating variously coated containers.

The length of the runway, obviously is somewhat dependent upon the particular nature of the protective coating and heating is resorted to, principally for the purpose of hastening the drying operation and insuring a better commercial product. It will be observed that merely the chime rings $b'$ of the barrels, Fig. 17, come into engagement with the rails, spacing members or advancing rolls, while the protective coating is still in fluid condition, hence the finish of the barrels is not impaired or marred.

In this connection it may be explained that the chime rings of the modern steel barrel have a burnished surface and do not necessarily require the protective coating normally applied to the sides and ends of the steel barrel.

While my system has been explained and shown in some detail, I desire to have it understood that my invention is not confined to the particular mode of operation or practice nor to the details of structure set forth, except as these may be defined in the appended claims.

Having now described apparatus adapted for the practice of the method of my inven- tion and certain novel structural features of the particular system shown, I claim as new and desire to secure by Letters Patent, the following:

1. The herein described method for drying fluid-coated cylindrical articles, which consists in subjecting said articles to a pre-coated drying, supporting said articles for axial rotation in non-marking relation, continuously rotating and subjecting the same while rotated to heat until their coatings have sufficiently dried.

2. The herein described method of setting fluid coatings upon or within cylindrical articles, which consists in rotatably supporting such articles in non-marring relation, effecting their rotation while thus supported along a drying zone to prevent unequal accumulation of the fluid body applied thereto, heating said zone and meantime maintaining said articles out of contact with each other.

3. The herein described method for drying fluid-coated cylindrical sheet metal articles, which consists in terminally supporting said articles, advancing the same by rolling them while thus terminally supported along a drying zone, heating said zone and meanwhile maintaining said articles out of contact with each other and foreign bodies until their coatings have dried.

4. The herein described method for finishing sheet metal barrels which consists in drying the same, applying a protective fluid-coating to the surfaces of said barrels, supporting them terminally for rotation and advancing the barrels by rotating them while thus supported, through an elongated heating zone, meanwhile maintaining said barrels out of contact with each other, and cooling said barrels when their coatings are sufficiently dried.

5. The herein described method for drying protectively coated sheet metal containers, which consists in supporting such containers solely by their chime rings while permitting their rotation, advancing said containers by rolling them along a heated zone, maintaining the coated surfaces of the containers out of contact with each other until dried, and removing the dried containers from the zone and setting the coated surfaces.

6. The herein described method for treating protectively coated sheet metal containers, which consists in supporting such containers solely by their chime rings while permitting their rotation, advancing said containers by rolling them along parallel terminal supports, heating said containers while thus rolled, and cooling said containers while still rolling them.

7. The herein described method for finishing cylindrical articles, which consists in initially drying said articles, applying a fluid-coating to the surfaces thereof, continuously rotating said article and passing it while rotated through a heated atmosphere until the coating is sufficiently dried.

8. The herein described method for finishing sheet metal containers, which consists in applying a protective fluid-coating to the surface thereof, and continuously rolling said containers through relatively heated and cooled zones for setting the said fluid-coatings.

9. The herein described method for finishing cylindrical articles, which consists in initially heating them, immediately applying a fluid-coating to the surfaces thereof, rotating said article continuously in non-marring relation and passing it while rotated through a heated atmosphere, whereby the coating is subjected interiorly and exteriorly to drying temperatures.

10. The herein described method of setting exterior fluid coatings on cylindrical articles, which consists in initially heating and then coating the articles, supporting them in non-marking relation, effecting their rotation along a heated zone and thereby setting the coating by interiorly and exteriorly applied heat.

11. The herein described method for finishing sheet metal barrels, which consists in applying a protective fluid-coating to the surfaces of said barrels, supporting them horizontally upon their chimes and advancing said barrels by continuously rotating them after being coated through an elongated heating zone, meanwhile maintaining said barrels out of contact with each other and foreign bodies to preserve their coatings intact, and cooling said barrels when their coatings are sufficiently dried.

In testimony whereof I do now affix my signature.

CHARLES T. DRAPER.